United States Patent [19]

Tang et al.

[11] Patent Number: 4,855,048
[45] Date of Patent: Aug. 8, 1989

[54] AIR DRIED CELLULOSE ACETATE MEMBRANES

[75] Inventors: Man-Wing Tang, Alhambra; William M. King, Los Alamitos; C. Glen Wensley, Villa Park, all of Calif.

[73] Assignee: Air Products and Chemicals, Inc., Allentown, Pa.

[21] Appl. No.: 150,265

[22] Filed: Jan. 29, 1988

Related U.S. Application Data

[63] Continuation of Ser. No. 99,572, Sep. 22, 1987, abandoned.

[51] Int. Cl.$^4$ .................... B01D 13/00; B01D 13/04
[52] U.S. Cl. .................... 210/500.3; 264/49; 264/342 R; 264/344; 264/DIG. 48; B01D/13/00; B01D/13/04
[58] Field of Search ...... 210/654, 655, 500.29–500.32; 264/41, 49, 342 R, 344, DIG. 48

[56] References Cited

U.S. PATENT DOCUMENTS

| | | | |
|---|---|---|---|
| 3,133,132 | 5/1964 | Loeb et al. | 264/49 |
| 4,147,622 | 4/1979 | Nussbaumer | 210/500.32 |
| 4,527,999 | 7/1985 | Lee | 210/654 |

OTHER PUBLICATIONS

G. J. Van Amorongen, "The Permeability of Rubberlike Substances to Gases," Communication No. 46, Rubber Stitching Rev. gen caoutchovc 21, 50–6.

William J. Ward III and Charles K. Neulander, U.S. Clearinghouse Fed. Sci. Tech. Inform. PB Rep. 1970, No. 191769, 15 pp, (Eng.).

Fitendra P. Agrawal and Sourirajan Srinivasa, J. Appl. Polym. Sci. 1970, 14(5), 1303–21 (Eng.).

Schell, William F.; Lawrence, Ralph W. and King, William M., United States Research and Development Administration Contract No. E (149-18-2000).

*Primary Examiner*—Frank Sever
*Attorney, Agent, or Firm*—Mark L. Rodgers; William F. Marsh; James C. Simmons

[57] ABSTRACT

The method of preparing dried asymmetric cellulose acetate blend membranes through the use of at least one drying agent which is a hydrophobic organic compound, such as polysiloxanes, hydrocarbons, ethers, ketones, chlorohydrocarbons or nitrohydrocarbons. The membranes are dried from their aqueous state by direct evaporation of water. The resulting air dried membranes are suitable for the desalination of water by reverse osmosis, non-aqueous liquid separation, ultrafiltration, pervaporation, and for the separation of various gaseous mixtures into their constituent parts.

34 Claims, No Drawings

AIR DRIED CELLULOSE ACETATE MEMBRANES

CROSS-REFERENCE TO RELATED APPLICATION

This application is a continuation-in-part of co-pending application Ser. No. 07/099,572 filed Sept. 22, 1987 abandoned.

BACKGROUND OF THE INVENTION

1. Field of the Invention

This invention relates to asymmetric cellulose acetate membranes and their use for desalination, nonaqueous liquid separation, ultrafiltration, pervaporation and gas separation. More particularly, the invention relates to a method for converting asymmetric membranes from their aqeuous state to the dry state by direct evaporation of water. In another aspect, the invention relates to the use of these membranes to separate liquid or gaseous mixtures into various fractions and to their use for reverse osmosis, ultrafiltration, and pervaporation.

2. Description of the Prior Art

Loeb and his co-workers disclose in, for example, U.S. Pat. No. 3,133,132 a method for preparing a modified cellulose acetate membrane for desalination of water by first casting a solution of cellulose acetate as a thin layer, and then forming a dense membrane skin on the thin layer through various techniques such solvent evaporation followed by quenching in cold water. Many research programs on reverse osmosis membranes have been very actively conducted. Reverse osmosis is now widely avaialble for many industrial applications such as desalination, pollution control, water reclamation, food processing and many other separation concentration and recovery processes.

Separation of gases by permeation through polymer membranes has generated considerable interest in recent years. Although the process has been known for over a century, recent advances are making it economically competitive in many areas. One of the earliest permeation studies was done by G. J. Van Amerongen, "The Permeability of Rubberlike Substances to Gases," Communication No. 46, Rubber Stichting Rev. gen caoutchouc 21, 50-6 (1944). He measured the permeability of nine rubbers to hydrogen, helium, oxygen, nitrogen, carbon dioxide and methane and independently determined solubilities and diffusivities which related to the nature of gases and rubbers. William J. Ward III and Charles K. Neulander, U.S. Clearinghouse Fed. Sci. Tech. Inform. PB Rep. 1970, No. 191769, 15 pp (Eng.) chose immobilized liquid membranes such as polyethylene glycol as a viable alternative. Some liquids have much larger diffusion coefficiants than solid polymers and may also have enormous solubilities for reactive gases. However, although the resulting polyethylene glycol membrane had shown excellent selectivity, the permeation rate was an order of magnitude too low for practical applications.

In addition to homogenous polymer membranes and immobilized liquid membranes, a third type of membrane that has been considered for gas separations is again the asymmetric membrane which was based on knowledge developed concerning liquid-liquid separation membranes by Loeb and Sourirajan. Jitendra P. Agrawal and Sourirajan Srinivasa, J. Appl. Polym. Sci. 1970, 14 (5), 1303–21 (Eng.) studied the permeation of pure gases and several binary gas mixtures through porous freeze-dried cellulose acetate membranes. Due to the porosity of the membrane, separation factors were rather low but the permeation rates were reasonable. Schell, William J.; Lawrence, Ralph W. and King, William M., United States Energy Research and Development Administration Contract No. E (149-18-2000)). William J. Schell, Ralph W. Lawrence and William M. King, United States Energy Research and Development Administration Contract No. E (149-18-2000) reported asymmetric cellulose acetate membranes which had selectivities characteristic of nonporous cellulose acetate films but much higher permeation rates. They used these membranes to separate hydrogen from methane and carbon monoxide and suggested applications in coal utilization processes.

As is well known to those skilled in the art, the membranes prepared by the techniques of Loeb and Sourirajan must be kept wet or in the case of gas separation, dried through special drying processes. If they are allowed to dry under ambient conditions, they undergo compaction and suffer a non-recoverable loss in permeation rate and selectivity. It is believed that the collapse of the membrane porosity is due to surface-tension related forces between the water and the membrane. These are so great that as the water globules within the membrane decrease in size, the pores around them collapse. Therefore, special drying processes are necessary for application to gas separation in order to prevent the membrane from shrinking and losing its asymmetric character as it does when the water is simply allowed to evaporate.

Many workers have attempted to dry asymmetric cellulose acetate membranes directly from the water-wet state that results from their being cast and gelled in water. Prior to this invention, all attempts to dry the membrane directly from water resulted in shrinkage and total flux loss, or involved the use of surfactants and generally humectants as well that were incorporated into the membrane by soaking it in an aqeous solution of the chemical prior to drying. This method worked fairly well when the membrane was used in reverse osmosis since the chemicals were washed out with the water when the membrane was put into service. It is not suitable for drying gas separation membranes, however, since the residue plugs the pores and renders the membranes impermeable to gases.

Only a few efforts to freeze-dry asymmetric membranes for gas separation have been made. This method is expensive and the membranes generally have impaired performance.

The drying method that is most widely used today is solvent exchange. In this approach, the water-wet membrane is soaked successively in a series of solvents so as to end up with a solvent that has little interaction with the polymer and thus will not affect the membrane in an adverse manner as it evaporates.

The general scheme has been to replace the water by soaking the membrane in an alcohol such as isopropanol alcohol (IPA). Then the alcohol, which would still cause the membrane to collapse if the membrane were dried from it, is often replaced with hydrocarbon such as hexane. At this point, the membrane can be dried without damage or loss of performance. The hexane is sometimes exchanged with a non-flammable liquid such as Freon prior to the final drying.

Accordingly, this invention pertains to a direct air-dried asymmetric cellulose acetate membrane prepared by an improvement in the Loeb et al technique. These seslectively permeable membranes are directly dried from their annealing step by evaporation of water. In general, these air-dried membranes exhibit the same gas permeation rates and high separation factors as cellulose acetate membranes dried by solvent exchange. Moreover, the membranes of this invention can be rewetted to provide desirable flux rates and selectivities in brackish water desalination by reverse osmosis. The advantages of the dry reverse osmosis membrane are several, including easier handling and increased storage life because of no bacteria growth. Furthermore, this invention provides a method for making direct air-dried cellulose acetate membranes in one preferred embodiment wherein the asymmetric structures are preserved by adding the hydropobic chemical drying agent to the casting solution.

SUMMARY OF THE INVENTION

Briefly, our invention comprises the method of preparing a novel dry semipermeable asymmetric cellulosic membrane which comprises:
a. Forming a casting solution comprising cellulose acetates and solvents for the cellulose acetates,
b. Casting the solution to form a thin uniform layer as a membrane,
c. Precipitating the membrane in water, and
d. Drying the membrane to recover a membrane having outstanding characteristics for desalination by reverse osmosis and for separation of gaseous mixtures into thir constituent pars;
wherein the drying agent is introduced prior to the drying step, and preferably is present in the casting solution.

The invention further includes dried membranes prepared by the foregoing method.

The drying agents are hydrophobic organic compounds having normal boiling points above 100° C., weak hydrogen bonding characteristics, and low solubility parameters.

It is an important object of this invention to provide a novel method of preparing dry cellulosic membranes useful in reverse osmosis, non-aqueous liquid separation, ultrafiltration, pervaporation and for gas separation.

More specifically, it is an object of our invention to provide dry cellulose acetate membranes having excellent gas separation and reverse osmosis membrane properties.

These and other objects and advantages of this invention will be apparent from the more detailed descripiton which follows.

In accordance with the preferred embodiment of this invention, the novel semipermeable membrane is prepared from a casting solution containing a blend of cellulose triacetate and cellulose diacetate polymer, an organic solvent mixture, a swelling agent, a poor or nonsolvent for the polymer and, a minimum concentration of at least one drying agent that typically has very weak hydrogen bonding characteristics, a low solubility parameter and appropriate boiling point (>100° C.). The novel membrane is fabricated by casting the solvent solution to form a thin layer on a smooth substrate, exposing it briefly to a gas such as air and precipitating the membrane in cold water followed by annealing in hot water. The final dry membrane can be achieved by evaporating water at or somewhat above ambient temperature.

It should be understood that, by the term "drying agent" as used in the present specification and claims is meant the particular chemical introduced in the casting formulation wherein the polymer is already dissolved in the appropriate solvents, or in the alternative, refers to the same chemical introduced into the isopropyl alcohol exchange both following precipitation of the membrane in water.

A non-exhaustive list of classes of suitable drying agents for use in the practice of the present invention is as follows:

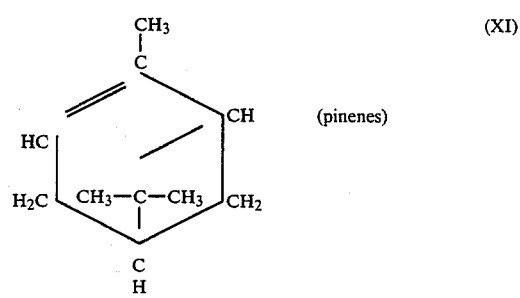

where:
R is an alkyl, aryl or alkyl-substituted derivative
p is a integer of at least 1, and normally not more than about 20
n is a integer of at least 8, and normally not more than about 20
X is a chloro or nitro group
m is an integer from 7 to about 12
a is an integer of at least 7, and normally not more than about 20
Y, if present, is a methyl or other lower alkyl, chloro or nitro. More than one Y group can be present as in xylene dichlorobenzene, or dinitrobenzene.

DETAILED DESCRIPTION OF THE INVENTION

The cellulosic polymers used to manufacture the air-dried semi-permeable membrane of this invention are the ester derivatives of cellulose, including the diacetate and the triacetate. A mixture of diacetate and triacetate is preferrable to the pure component and thus is used in the preferred embodiments. The practical acetyl content of cellulose acetate is about 39.8% by weight for diacetate and 43.2% by weight for triacetate. These materials are commercially avaiable and well known in the art. Examples of the organic solvents used in the practice of the present invention are acetone, dioxane, methanol and mixtures thereof.

The drying agents used to prepare the air-dried membranes of this invention are generally of the formulae (I) to (XI) where R, p, n, X, m, a and Y are as previously defined. The subscript p in formula (I) can range from a relatively small number, such as 1 to a relatively large number such as 10 or more and the silicon compounds of the formula (I) are generally known as siloxanes. A mixture of the high and low molecular weight is also effective as the drying agent for its intended purpose. Typically hydrocarbons of formulae (II), (III) and (IV) suitable for air-dried membrane according to the invention can be saturated or unsaturated hydrocarbons of 8 to about 20 carbon atoms, such as octane, nonane, decane, undecane, cyclooctane, octene, decene, pinene and decyne. Aromatic or substituted aromatic hydrocarbons including xylene, chlorobenzene and nitrobenzene are also suitable for the application. In the case of ether derivatives of formula (VII), aliphatic ether compounds such as n-butyl ether is preferred.

Selection of the drying agents for the air-dried membrane may be made on the basis of low solubility parameter ($\delta_T$ 10 to 23), weak hydrogen bonding charhacteristics ($\delta_H$ 0 to 7) and suitable boiling point (greater than or equal to 100° C.), as well as other factors dictated by the compatibility of the casting solution toward the particular chemical. The air-dried membranes here can be prepared by casting from a solution comprised of a mixture of a good solvents, a poor or nonsolvent for the polymer material, a swelling agent and at least one of the drying agents to preserve the asymmetric structure of the membrane after the water is evaporated from the membrane.

In general, the cellulosic polymers are dissolved in suitable solvents to form about 10 to 18, preferably 13 to 17, weight percent solutions. In particular, the ratio of dioxane to acetone is 1:1 to 7:1, but preferably 3:1. The concentration of the nonsolvent, preferably methanol, can be 7 to 13% based on the total mixture. The amount of swelling agent, preferably lactic acid, can be 1 to 4% of the total weight. The amount of drying agent added to the casting solution can vary widely but is an effective amount, typically between about 1 and about 10 weight percent based on the combined weight of the total mixture, and more preferably between about 2 and 5 weight percent.

The drying agents are generally admixed neat with the polymer solution to form a uniform mixture. The mixing can be done at a convenient temperature but is generally done at room temperature. The resulting mixture is then carefully filtered to remove all contaminants such as fibers, dust and undissolved gel particles. The filtered casting solution is first cast onto a smooth substrate, such as nylon or dacron cloth followed by precipitation in cold water and finally annealed in hot water. The precipitation temperature is 0° to 2° C. and the soaking of the membrane in the cold bath is preferably 10 minutes or more. The annealing temperature for the membrane is generally between 70° and 90° C. for at least 4 minutes or more. The resulting wet membrane is then air-dried either under ambient conditions for suitable periods of time, generally in excess of 20 minutes at ambient temperature or at low heat with air.

"Free standing" blend membranes, i.e., membrane without a support cloth, have also been successfully cast on aluminized Mylar.

As shown herein, the effective drying agents must meet several criteria:

Non-solvent for cellulose acetate.
Soluble in the casting solution.
Insoluble in water.
Low surface tension.
Boiling point above that of water.

In order to meet these criteria, it has been found that the polar and hydrogen bonding components of the solubility parameter must be very low. Silicone fluids and many hydrocarbons having largely dispersion forces meet these criteria quite well. They do not dissolve cellulose acetate. They are soluble in the cellulose acetate casting solution. They are insoluble in water and they have very low surface tensions. They are available in the desirable boiling point range, which ranges from 150 to 200 degrees centigrade for the most effective additives.

The following examples are illustrations of certain specific embodiments of this invention.

TABLE I

| for-mula-tion | Drying Agent | CONC | M. Wt. | B. Pt. | $\delta^2 t$ | $\delta^2 h$ | AIR DRIED MEMBRANE GAS AND REVERSE OSMOSIS PURE GAS PERFORMANCE AT ROOM TEMPERATURE Permeation Rate (SCFH/FT2/100 psi) | | | | SELECTIVITY | | | | MIXED GAS PERFORMANCE @ 60C (20% CO2 IN METHANE 300 psi (SCHF/FT2/100 psi) | | | REVERSE OSMOSIS PERFORMANCE (2000 ppm NaCl @ 425 psi) | |
|---|---|---|---|---|---|---|---|---|---|---|---|---|---|---|---|---|---|---|---|
| | | | | | | | $N_2$ | $CH_4$ | $CO_2$ | He | $CO_2/N_2$ | $CO_2/CH_4$ | $He/N_2$ | $He/CH_4$ | METHANE | $CO_2$ | $CO_2/ME$ Selectivity | FLUX, GFD | REJECTION % |
| 1 | NONE/SOLVENT EXCHANGE** | | | | | | 0.315 | 0.403 | 13.09 | 28.51 | 38.58 | 32.45 | 90.36 | 70.67 | 0.697 | 10.38 | 14.89 | 19.6 | 98.2 |
| 1 | NONE (CONTROL) | | | | | | 0.005 | | 0.07 | 0.21 | 14.0 | — | 42.6 | 57.64 | 0.0075 | 0.11 | 14.0 | 0.9 | 96.1 |
| 1 | UNDECANE | 2.0 | 156 | 196 | 16.1 | 0 | 0.380 | 0.472 | 13.19 | 27.94 | 34.75 | 27.94 | 71.68 | 50.78 | 1.213 | 15.98 | 13.18 | 12.9 | 98.8 |
| 1 | UNDECANE | 1.5 | 156 | 196 | 16.1 | 0 | 0.435 | 0.525 | 13.53 | 26.66 | 31.12 | 25.77 | 61.33 | 77.92 | 0.988 | 12.91 | 13.12 | 15.0 | 98.2 |
| 1 | DECANE | 1.5 | 142 | 174 | 15.8 | 0 | 0.251 | 0.265 | 9.53 | 20.65 | 37.97 | 35.94 | 82.33 | 55.13 | 0.916 | 12.56 | 11.92 | 10.2 | 98.7 |
| 1 | DECANE | 2.0 | 142 | 174 | 15.8 | 0 | 0.375 | 0.441 | 10.58 | 24.29 | 28.24 | 24.01 | 64.84 | 55.13 | 0.802 | 12.03 | 15.01 | 10.9 | 98.7 |
| 1 | NONANE | 2.0 | 128 | 151 | 15.6 | 0 | 0.272 | 0.32 | 10.55 | 23.05 | 38.11 | 33.01 | 83.26 | 72.12 | 0.935 | 12.04 | 12.87 | 11.5 | 98.0 |
| 1 | OCTANE | 2.0 | 114 | 126 | 15.4 | 0 | 0.178 | 0.265 | 0.24 | 1.00 | 1.36 | 0.92 | 5.63 | 3.79 | | | | 2.9 | 93.3 |
| 1 | OCTANE | 4.0 | 114 | 126 | 15.4 | 0 | 0.260 | 0.323 | 8.84 | 19.57 | 33.96 | 27.42 | 75.15 | 60.68 | 0.809 | 10.93 | 13.52 | 10.6 | 98.7 |
| 1 | OCTANE | 6.0 | 114 | 126 | 15.4 | 0 | 0.365 | 0.436 | 7.63 | 13.58 | 20.89 | 17.50 | 37.17 | 31.15 | | | | 14.4 | 96.3 |
| 1 | HEPTANE | 8.0 | 100 | 98 | 15.3 | 0 | 0.038 | 0.046 | 1.11 | 2.85 | 29.13 | 24.24 | 74.80 | 62.23 | | | | | |
| 1 | DECANE | 3.0 | 142 | 174 | 15.8 | 0 | 0.410 | 0.479 | 14.60 | 30.10 | 35.64 | 30.47 | 73.45 | 62.81 | 1.326 | 17.78 | 13.41 | 13.8 | 98.6 |
| 1 | DECANE | 5.0 | 142 | 174 | 15.8 | 0 | 0.390 | 0.433 | 14.29 | 30.09 | 36.64 | 33.03 | 77.15 | 69.56 | | | | 18.0 | 98.5 |
| 1 | UNDECANE | 4.0 | 156 | 196 | 16.1 | 0 | 0.512 | 0.637 | 16.59 | 34.25 | 32.40 | 26.06 | 66.88 | 53.79 | 2.200 | 20.03 | 9.09 | 14.3 | 98.1 |
| 1 | XYLENE | 4.0 | 106 | 135 | 18.5 | 2.4 | 0.175 | 0.229 | 6.87 | 13.47 | 39.18 | 29.97 | 76.80 | 58.74 | 0.653 | 7.45 | 11.40 | 7.8 | 98.3 |
| 1 | TOLUNE | 5.0 | 92.1 | 111 | 18.3 | 1.6 | 0.137 | 0.159 | 3.48 | 7.77 | 25.40 | 21.91 | 56.72 | 48.93 | | | | 5.4 | 96.3 |
| 1 | N-BUTYLETHER | 4.0 | 130 | 143 | 14.9 | 4.5 | 0.251 | 0.272 | 7.38 | 20.60 | 29.16 | 25.68 | 81.39 | 71.68 | 0.756 | 9.37 | 12.39 | 10.6 | 99.4 |
| 1 | PHENYLETHER | 2.0 | 170 | 259 | 18.2 | 5 | 0.019 | 0.023 | 0.43 | 1.23 | 22.66 | 19.00 | 64.61 | 54.17 | | | | 3.3 | 94.2 |
| 1 | 4-METHYL-2-PENTANONE | 8.0 | 100 | 118 | 17.6 | 5.9 | 0.055 | 0.076 | 0.32 | 0.82 | 5.82 | 4.19 | 14.89 | 10.71 | | | | | |
| 1 | 4-HEPTANONE | 4.0 | 114 | 145 | 17.8 | 6.9 | 0.265 | 0.368 | 0.42 | 1.21 | 1.59 | 1.14 | 4.57 | 3.29 | | | | | |
| 1 | HEXANOL | 2.0 | 102 | 156 | 22 | 14 | 0.000 | 0.000 | 0.00 | 0.00 | 0.00 | 0.00 | 0.00 | 0.00 | 0.000 | 0.00 | 0.00 | 0.0 | 0.0 |
| 1 | CYCLOHEPTANE | 4.0 | 98.2 | 119 | 17.5 | 0 | 0.044 | 0.064 | 0.39 | 0.91 | 8.95 | 6.13 | 20.89 | 14.31 | | | | 3.8 | 95.1 |
| 1 | CYCLOHEPTANE | 8.0 | 98.2 | 119 | 17.5 | 0 | 0.061 | 0.075 | 1.41 | 3.80 | 23.07 | 18.75 | 62.16 | 50.52 | | | | 4.8 | 95.9 |
| 1 | CYCLOOCTANE | 2.0 | 112 | 155 | 17.5 | 0 | 0.110 | 0.156 | 0.63 | 1.44 | 5.74 | 4.05 | 13.07 | 9.21 | | | | 6.4 | 92.0 |
| 1 | CYCLOOCTANE | 6.0 | 112 | 155 | 17.5 | 0 | 0.171 | 0.218 | 4.39 | 9.83 | 25.69 | 20.17 | 57.52 | 45.17 | 0.568 | 5.54 | 9.75 | 10.3 | 97.6 |
| 1 | CYCLOOCTANE | 8.0 | 112 | 155 | 17.5 | 0 | 0.178 | 0.23 | 2.98 | 7.18 | 16.78 | 12.95 | 40.38 | 31.18 | | | | | |
| 1 | CHLOROBENZENE | 4.0 | 113 | 132 | 18.7 | 0 | 0.182 | 0.234 | 1.35 | 2.75 | 7.41 | 5.77 | 15.10 | 11.75 | | | | | |
| 1 | CHLOROBENZENE | 6.0 | 113 | 132 | 18.7 | 0 | 0.152 | 0.188 | 3.60 | 8.62 | 23.60 | 19.12 | 56.60 | 45.78 | 0.428 | 5.80 | 13.56 | 5.1 | 98.5 |
| 1 | NITOROBENZENE | 4.0 | 123 | 210 | 22.5 | 1.3 | 0.069 | 0.089 | 1.98 | 3.35 | 28.45 | 22.20 | 48.13 | 37.56 | | | | | |
| 1 | NITOROBENZENE | 6.0 | 123 | 210 | 22.5 | 1.3 | 0.097 | 0.119 | 3.16 | 7.06 | 32.75 | 26.53 | 73.16 | 59.28 | 0.401 | 6.15 | 15.32 | 5.3 | 99.1 |
| 1 | PERCHLOROETHLENE | 4.0 | 166 | 121 | 19 | 2.3 | 0.428 | 0.665 | 0.39 | 1.02 | 0.91 | 0.59 | 2.38 | 1.53 | | | | | |
| 1 | (1.5c.s.)DMPSI | 2.0 | 311 | 195 | 10 | 0 | 0.265 | 0.322 | 10.58 | 15.97 | 39.88 | 32.83 | 60.20 | 49.55 | 1.210 | 13.60 | 9.74 | 12.5 | 98.0 |
| 1 | (1.0c.s.)DMPSI | 2.0 | 236 | 153 | 10 | 0 | 0.267 | 0.311 | 9.88 | 17.76 | 36.98 | 31.76 | 66.47 | 57.09 | 0.920 | 10.75 | 10.16 | 10.9 | 96.1 |
| | (0.65c.s.)DMPSI | 7.0 | 162 | 100 | 10 | 0 | 0.218 | 0.274 | 6.89 | 11.52 | 31.64 | 25.15 | 52.92 | 42.06 | | | | 7.4 | 98.0 |
| | (1.0+0.65c.s.)DMPSI | 4.0 | | | | | 0.536 | 0.675 | 13.27 | 27.45 | 24.77 | 19.67 | 51.23 | 40.68 | | | | 14.6 | 97.4 | |
| | (1.5+1.0c.s.)DMPSI | 2.5 | | | | | 0.584 | 0.724 | 18.39 | 34.01 | 31.50 | 25.39 | 58.26 | 46.95 | 1.120 | 13.17 | 11.75 | 15.4 | 97.7 | |
| | (1.0+0.65c.s.)DMPSI | 3.0 | | | | | 0.242 | 0.364 | 6.62 | 12.71 | 27.39 | 21.78 | 52.56 | 41.78 | | | | 9.0 | 97.9 | |
| | (1.5+0.65c.s.)DMPSI | 2.0 | | | | | 0.232 | 0.291 | 7.41 | 13.59 | 31.91 | 25.47 | 58.55 | 46.73 | | | | 10.6 | 98.3 | |
| 1 | 1-DECENE | 1.0 | 140 | 181 | 16 | 1.3 | 0.232 | 0.305 | 6.72 | 16.45 | 28.94 | 22.06 | 70.84 | 54.01 | 0.761 | 9.55 | 12.54 | 9.1 | 98.1 |
| 1 | 1-DECENE | 2.0 | 140 | 181 | 16 | 1.3 | 0.557 | 0.691 | 15.61 | 34.15 | 28.04 | 22.61 | 61.34 | 49.46 | 1.680 | 16.62 | 9.86 | 14.1 | 98.9 |
| 1 | 1-OCTENE | 6.0 | 112 | 123 | 15.5 | 2.3 | 0.346 | 0.419 | 9.23 | 20.97 | 26.68 | 22.05 | 60.61 | 50.10 | 1.220 | 12.51 | 10.29 | 9.6 | 98.4 |
| 1 | 1-PIENE | 6.0 | 136 | 155 | 16.2 | 0 | 0.191 | 0.252 | 4.09 | 9.02 | 21.44 | 16.22 | 47.27 | 35.77 | | | | 5.3 | 98.1 |
| 1 | CHLOROOCTANE | 2.0 | 149 | 183 | 17.3 | 0 | 0.232 | 0.272 | 7.84 | 18.25 | 33.79 | 28.82 | 78.66 | 67.10 | 0.839 | 12.54 | 14.94 | 9.4 | 98.8 |
| 1 | CYCLOOCTENE | 4.0 | 110 | 146 | 17.6 | 2.5 | 0.355 | 0.434 | 8.04 | 17.49 | 22.63 | 18.51 | 49.23 | 40.26 | | | | 9.5 | 98.7 |

TABLE I-continued

| for-mula-tion | Drying Agent | CONC | M. Wt. | B. Pt. | $\delta^2 t$ | $\delta^2 h$ | AIR DRIED MEMBRANE GAS AND REVERSE OSMOSIS PURE GAS PERFORMANCE AT ROOM TEMPERATURE Permeation Rate (SCFH/FT2/100 psi) | | | | SELECTIVITY | | | | MIXED GAS PERFORMANCE @ 60C (20% CO2 IN METHANE 300 psi (SCHF/FT2/100 psi) | | CO2/ME Selectivity | REVERSE OSMOSIS PERFORMANCE (2000 ppm NaCl @ 425 psi) | |
|---|---|---|---|---|---|---|---|---|---|---|---|---|---|---|---|---|---|---|---|
| | | | | | | | $N_2$ | $CH_4$ | $CO_2$ | He | $CO_2/N_2$ | $CO_2/CH_4$ | $He/N_2$ | $He/CH_4$ | METHANE | $CO_2$ | | FLUX GFD | REJECTION % |
| 1 | DECYNE | 2.0 | 138 | 174 | 15.9 | 0 | 0.265 | 0.343 | 9.07 | 18.92 | 24.26 | 26.42 | 71.45 | 55.10 | 1.150 | 14.05 | 12.19 | 9.3 | 98.6 |
| 1 | CHLOROOCTANE+DECANE | 2.0 | | | 16.6 | 0 | 0.382 | 0.466 | 11.46 | 25.80 | 29.26 | 24.60 | 65.67 | 55.38 | | | | 15.1 | 98.7 |
| 1 | CHLOROOCTANE+DECANE | 2.0 | | | 16.6 | 0 | 0.332 | 0.39 | 13.59 | 25.40 | 40.93 | 34.82 | 76.51 | 65.08 | 1.230 | 17.01 | 13.84 | 12.0 | 99.1 |
| 1 | 1,5,9-CYCLODECATRIENE | 2.0 | 162 | 231 | 17.7 | 0 | 0.440 | 0.591 | 4.11 | 7.26 | 9.34 | 6.95 | 16.49 | 12.28 | | | | | |
| 1 | CHLOROOCTANE | 3.0 | 148 | 183 | 17.3 | 0 | 0.551 | 0.692 | 14.89 | 27.94 | 27.04 | 21.53 | 50.74 | 40.40 | | | | 15.9 | 98.3 |
| 1 | DECYNE | 3.0 | 138 | 174 | 15.9 | 0 | 0.613 | 0.837 | 12.07 | 21.76 | 19.70 | 14.42 | 35.51 | 26.00 | | | | 10.8 | 97.6 |
| 2 | (0.65+1.0c.s.)DMPSI | 3.0 | | | 10 | 0 | 0.366 | 0.454 | 12.38 | 19.03 | 33.79 | 27.30 | 51.94 | 41.96 | | | | 15.1 | 95.4 |
| 2 | (0.65+1.0c.s.)DMPSI | 3.0 | | | 10 | 0 | 0.254 | 0.279 | 9.72 | 19.20 | 38.24 | 34.76 | 75.59 | 68.62 | 0.979 | 12.61 | 12.89 | | |
| 2 | (1.5+1.0c.s.)DMPSI | 2.5 | | | 10 | 0 | 0.448 | 0.574 | 13.55 | 23.48 | 30.24 | 23.61 | 52.40 | 40.90 | 1.240 | 14.11 | 11.40 | 17.7 | 95.1 |
| 2 | (1.5c.s.)DMPSI | 2.0 | 311 | 195 | 10 | 0 | 0.402 | 0.529 | 10.41 | 15.86 | 25.90 | 19.67 | 39.46 | 29.96 | | | | | |
| 2 | DECANE | 2.0 | 142 | 174 | 15.8 | 0 | 0.201 | 0.212 | 7.73 | 16.64 | 37.61 | 34.48 | 81.00 | 74.24 | 0.697 | 10.15 | 12.67 | | |
| 3 | (1.5+1.0c.s.)DMPSI | 2.5 | | | 10 | 0 | 0.278 | 0.367 | 10.76 | 14.28 | 38.65 | 29.30 | 51.29 | 38.89 | | | | 12.0 | 98.4 |
| 3 | (1.0c.s.)DMPSI | 3.0 | 236 | 153 | 10 | 0 | 0.287 | 0.342 | 9.85 | 16.60 | 34.37 | 28.82 | 57.94 | 58.59 | | | | 14.8 | 97.6 |
| 3 | DECANE | 2.0 | 142 | 174 | 15.8 | 0 | 0.188 | 0.263 | 7.37 | 13.89 | 39.07 | 27.23 | 73.69 | 51.35 | 0.787 | 10.53 | 11.63 | 10.6 | 98.1 |
| 3 | UNDECANE | 2.0 | 156 | 196 | 16.1 | 0 | 0.320 | 0.376 | 11.99 | 24.26 | 37.45 | 31.91 | 75.77 | 64.57 | 1.020 | 13.52 | 13.21 | 10.3 | 98.7 |
| 4 | NOANE | 2.0 | 128 | 151 | 15.6 | 0 | 0.554 | 0.68 | 12.66 | 26.84 | 22.85 | 18.61 | 48.44 | 39.46 | | | | 11.3 | 98.4 |
| | DECANE | 4.0 | 142 | 174 | 15.8 | 0 | 0.060 | 0.067 | 2.03 | 5.46 | 33.63 | 30.29 | 90.20 | 81.26 | | | | 6.9 | 91.5 |
| | DECANE | 6.0 | 142 | 174 | 15.8 | 0 | 0.685 | 0.705 | 2.36 | 6.15 | 34.50 | 33.48 | 90.00 | 87.23 | 0.231 | 3.49 | 15.13 | | |
| 6 | NONE (CONTROL) | 0.0 | | | | | 0.011 | 0.016 | 0.22 | 0.43 | 19.77 | 14.04 | 38.43 | 27.30 | | | | | |
| 6 | (1.0c.s.)DMPSI | 5.0 | 236 | 153 | 10 | 0 | 0.142 | 0.166 | 4.99 | 9.72 | 35.13 | 30.07 | 65.35 | 55.93 | | | | | |
| 6 | (1.5c.s.)DMPSI | 7.0 | 311 | 195 | 10 | 0 | 0.249 | 0.328 | 10.11 | 15.05 | 40.06 | 30.86 | 60.44 | 45.94 | | | | | |
| 6 | DECANE | 10.0 | 142 | 174 | 15.8 | 0 | 0.244 | 0.287 | 10.11 | 19.40 | 41.45 | 35.29 | 79.54 | 67.71 | 0.715 | 8.70 | 12.17 | 15.2 | 98.0 |
| 6 | CYCLOOCTENE | 10.0 | 112 | 155 | 17.6 | 2.5 | 0.086 | 0.102 | 3.08 | 5.98 | 35.73 | 30.34 | 69.38 | 58.93 | | | | | |
| 7 | (1.5c.s.)DMPSI | 2.0 | 311 | 195 | 10 | 0 | 0.161 | 0.213 | 1.56 | 11.31 | 9.68 | 7.31 | 14.97 | 11.31 | | | | | |

CONC: CONCENTRATION BY PARTS IN THE CASTING SOLUTION
M. Wt.: MOLECULAR WEIGHT OF THE DRYING AGENT
B. Pt.: BOILING POINT OF THE DRYING AGENT
$\delta^2 t$: HILDEBRAND SOLUBILITY PARAMETER IN $MPa^{\frac{1}{2}}$
$\delta^2 h$: HILDEBRAND HYDROGEN PARAMETER IN $MPa^{\frac{1}{2}}$
FORMULA 1 - 10 PTS CA; 10 PTS CTA; 8 PTS CA; 60 PTS DIOXANE; 20 PTS ACETONE; 15 PTS METHANOL; 3 PTS LACTIC ACID
FORMULA 2 - 12 PTS CA; 12 PTS CTA; 70 PTS DIOXANE; 10 PTS ACETONE; 15 PTS METHANOL; 3 PTS LACTIC ACID
FORMULA 3 - 12 PTS CA; 8 PTS CTA; 60 PTS DIOXANE; 20 PTS ACETONE; 11 PTS METHANOL; 3 PTS LACTIC ACID
FORMULA 4 - 8 PTS CA; 12 PTS CTA; 60 PTS DIOXANE; 20 PTS ACETONE; 15 PTS METHANOL; 3 PTS LACTIC ACID
FORMULA 5 - 30 PTS CA; 0 PTS CTA; 50 PTS DIOXANE; 30 PTS ACETONE; 12 PTS METHANOL; 3 PTS LACTIC ACID
FORMULA 6 - IPA SOLVENT EXCHANGE; 10 PTS CA; 10 PTS CTA; 60 PTS DIOXANE; 20 PTS ACETONE; 15 PTS METHANOL; 3 PTS LACTIC ACID
FORMULA 7 - 0 PTS CA; 14 PTS CTA; 60 PTS DIOXANE; 20 PTS ACETONE; 9 PTS METHANOL; 1.5 PTS N—METHYLFORMAMIDE
CA - CELLULOSE ACETATE
CTA - CELLULOSE TRIACETATE
IPA - ISOPROPYL ALCOHOL
DMPSi - DIMETHYLPOLY SILOXANE
*NO DRYING AGENT
**PRIOR ART SOLVENT EXCHANGE PROCEDURE In each of the foregoing examples, the formulation having the composition shown was prepared, and the solution cast to form a thin, uniform membrane layer which was precipitated in water. The membrane was then dried. In the Formulations 1 through 5 and 7, the drying agent was present in the casting solution. Formulation 6 did not include the drying agent in the casting solution.

The data using Formulation 6 near the end of Table I demonstrate that the drying agents also prevent the membrane from collapsing when it is directly dried from alcohol (IPA) containing the drying agent. The appropriate amount of the drying agent is introduced into the IPA exchange bath and the membrane is dried from it.

The foregoing data show that organic compounds having the characteristics described herein are quite effective as drying agents in yielding useful dry cellulosic membranes and that compounds which lack these characteristic e.g. (the highly polar hexanol) result in failure. The data also show that, in general, the use of the drying agents of this invention yield membranes having performance properties in both gas separation and reverse osmosis applications equal to or better than the properties of membranes prepared by solvent exchange.

The foregoing data were obtained using flat sheet membranes. Similar results are obtainable using membranes having other configurations such as tubular and hollow fibers.

While not bound by any theory, it is believed that the following discussion serves to explain the working of our invention. A molecule in the interior of a liquid is attracted equally in all directions since it is equally surrounded on all sides by other molecules. For a molecule on the surface, however, there is a net inward attractive force because there are more molecules per unit volume in the liquid than there are in the vapor phase. Liquids thus tend to contract to a minimum area surface, as in the case of drops and bubbles. As a result of this tendency to contract, a surface always behaves as if it were in a state of tension. If a cut were made along a line in the surface, a force would have to be applied to hold the edges together. It is called the surface tension.

One of the many consequences of surface tension is that the pressure on the concave side of a surface must be greater than that on the convex side. If this were not so, a bubble could not exist, for it would collapse as a result of the force due to surface tension. The excess internal pressure (P) required to prevent the collapse of a gas bubble in a liquid is given by the following equation.

$$P = 2\gamma/r$$

where $\gamma$ is the surface tension of the liquid and r is the radius of the bubble. As shown above, the excess internal pressure required to maintain an air bubble in a liquid is inversely proportional to the radius of the bubble, which is critical in membrane drying.

As water diffuses out of a pore within a membrane, negative forces develop that must lead to one of three things: formation of a cavity within the water in the pore, separation of the water from the pore wall or collapse of the pore.

Since the cavity would initially be only a few Angstroms in diameter, a negative force of thousands of pounds per square inch would be exerted on the pore before cohesive failure of the water could lead to the formation of a cavity.

Young's equation shows that the work of adhesion between water and the wet cellulose acetate membrane, which exhibits a contact angle of about 15 degrees with water, is almost as great at the work of cohesion (twice the surface tension) of water alone:

$$W(\text{polymer/water}) = \gamma(\text{water}) \times (1 + \text{Cosine } 15)$$
$$= 143.4 \text{ mJ m}^{-2}$$

$$W(\text{water}) = 2 \times \gamma(\text{water})$$
$$= 145.6 \text{ mJ m}^{-2}$$

It is thus seen that nearly the full cohesive strength of water is exerted on the membrane during drying. With its high surface tension, it is no wonder that water tends to collapse the pores of cellulose acetate membranes.

Hexane by contrast has a much lower surface tension and does not cause the membrane to collapse. Its work of cohesion is:

$$W(\text{hexane}) = 2 \times \gamma(\text{hexane})$$
$$= 3.68 \text{ mJ m}^{-2}$$

The approach in the present invention is a break from the previous methods used for drying cellulose acetate membranes and is the essence of simplicity. It consists of adding a carefully selected fluid, the "drying agent", to the casting solution. Upon gelation, the drying agent surrounds and isolates the water in the pores of the resulting membrane and allows it to be dried without collapsing. This liquid, which is an inert non-solvent for cellulose acetate, is soluble in the casting solution but insoluble in water. Its boiling point is preferably quite a bit higher than that of water. Its surface tension is much lower than the surface tension of water as well as the critical surface tension of wetting, $\gamma_c$ of cellulose acetate.

The main importance of the critical surface tension is that liquids having a surface tension lower than the critical surface tension spread on that surface, thus obeying the general rule that liquids of lower surface free energy spread over liquids or solids of higher surface free energy, thereby lowering the total system surface free energy.

Silicone fluids as well as most hydrocarbons have surface tensions much lower than that of water as well as the critical surface tension value of 39 reported for cellulose acetate. As the nascent membrane precipitates in the gel bath, these liquids are forced out of solution and due to their low surface tensions, spread at the interface beween the cellulose acetate and the water. They wet the membrane, not just on the dense layer, but more importantly, throughout the entire porous region as well. As a result, the membrane is shielded from the water, which is no longer in direct contact with the pore walls.

There are now two interfaces within the pore, whereas before there were only the water-polymer interface. As water diffuses out of the membrane during the drying step and negative forces develop that previously led to membrane collapse, separation can now occur at any one of four places:

Between the pore wall and the liquid additive.

Within the liquid additive.
Between the liquid additive and the water.
Within the water.

Since the liquid additive has been selected to spread on the polymer, it must bond more strongly to the pore wall than it does to itself, which leaves the later three places referred to above for separation to occur.

As shown earlier, the work of cohesion is much greater for water than it is for a hydrocarbon such as hexane. Therefore, cohesive failure of the additive will take place before a cavity can form in the water.

Cohesive failure of the liquid additive and adhesive separation between the liquid additive and the water are closely related in terms of the work required to generate a new interface. It has been pointed out that the work of adhesion between two mutually saturated liquids is equal to the work of cohesion of the liquid of lower surface tension after saturation with that of higher surface tension. Since water raises the surface tension of aliphatic hydrocarbons only slightly, the work of adhesion between water and simple hydrocarbons such as n-octane is therefore essentially equal to the work of cohesion of the hydrocarbon itself.

The work of separation during drying can now be compared for a membrane containing water alone with one containing water plus n-octane:

$W$(polymer/water) = $\gamma$(water) × (1 + Cosine 15)
= 143.4 mJ m$^{-2}$ $W$(n-octane/water) = 2 × $\gamma$(n-octane)
= 43.6 mJ m$^{-2}$ As show above, the work of separation during drying has been reduced from 143.4 mJ m$^{-2}$ for a water only system to only 43.6 mJ m$^{-2}$ the system containing n-octane. It is clear that low surface tension liquids are best suited to this purpose.

Since the surface tension of n-octane is only slightly higher than that of hexane, i.e., 21.8 vs. 18.4 mN m$^{-1}$, the work of forming a new interface in the water-octane system is not much more than it is when the membrane is dried from hexane alone in the solvent exchange process, i.e., 43.6 vs. 36.8 mJ m$^{-2}$.

In summary, the water within the membrane becomes isolated from the pore walls by a film of n-octane. Due to its lower boiling point, the water evaporates first. As negative forces develop that previously led to membrane collapse, the water breaks free from the n-octane but remains isolated from the pore wall by the n-octane. After the water is all gone, the n-octane evaporates, leaving the membrane with its structure fully intact and with no trace of residue.

Surface tension values are not readily available for some of the liquids involved in this study. Since solubility data is widely known and the dispersion, polar and hydrogen bonding components are generally available, the solubility parameter was helpful in selecting the liquids for this study.

Strong attractive or cohesive forces exist between molecules in liquid phases. An estimate of their magnitude is provided by the molar cohesive density, $-U$. Cohesive energy density, i.e., cohesive energy per unit volume, $-U/V$, is the basis of the original definition by Hildebrand and Scott of what is now generally called the Hildebrand solubility parameter, $\delta$. This parameter was intended for non-polar, non-dissociating systems, but has now been extended to all systems.

An empirical equation relating the solubility parameter to surface tension was developed by Hildebrand and Scott:

$$\delta = k(\gamma/V^{\frac{1}{3}})^{0.43}$$

where
k is a constant and V is the molar volume.

Another approach to determining the Hildebrand solubility parameter was developed by Hansen. He assumed that the cohesive energy is made up of a linear combination of contributions from dispersion interactions ($-Ud$), polar interactions ($-Up$), and hydrogen bonding or similar specific association interactons ($-Uh$).

$$-U = Ud - Up - Uh$$

It follows that the corresponding cohesive pressures and cohesion parameters can be defined so that:

$$-U/V = -Ud/V - Up/V - Uh/V$$

and hence:

$$\delta^2 t = \delta^2 d + \delta^2 p + \delta^2 h$$

In the past, the cohesive energy density has been given in units of energy per unit volume, often cal cm$^{-3}$. Although the units cal cm$^{-3}$ for cohesive energy density and cal$^{\frac{1}{2}}$ and cm$^{-3/2}$ for solubility parameters are still widely used, eventual conversion to the International System of Units (SI) is inevitable and it was used by Allan Barton when he compiled the CRC Handbook of Solubility Parameters and Other Cohesion Parameters in 1983. The most appropriate unit for the cohesion parameter is mPa$^{\frac{1}{2}}$.

Having fully described the invention, it is intended that it be limited only by the lawful scope of the appended claims.

We claim:

1. The method of preparing a novel dry semipermeable asymmetric cellulosic membrane which comprise:
   (a) forming a casting solution comprising cellulose acetates and a solvent for the cellulose acetates,
   (b) casting the solution to form a thin uniform layer,
   (c) precipitating the membrane in water, and
   (d) directly drying the membrane from the aqueous state to recover a membrane having outstanding characteristics for desalination by reverse osmosis, ultrafiltration, non-aqueous liquid separation, pervaporation, and for separation of gaseous mixtures into their constituent parts,
wherein a drying agent is introduced prior to the drying step and is a hydrophobic organic compound having a normal boiling point above 100° C., weak hydrogen bonding characteristics, and a low solubility parameter.

2. The method of claim 1 wherein the drying agent is included in the casting solution.

3. The method of claim 1 wherein the membrane is contacted with the drying agent after the precipitation step.

4. The method of claim 1 wherein the drying agent is one which yields a membrane having superior gas separation or permeation and reverse osmosis characteristics including flux or rejection as compared with one which has been air dried from the water-wet state without the benefit of a suitable drying agent.

5. The method of claim 1 wherein the membrane is exposed briefly to a gas just prior to the precipitation step.

6. The method of claim 1 wherein the membrane is precipitated in cold water.

7. The method of claim 1 wherein the membrane is annealed in hot water prior to the drying step.

8. The method of claim 1 wherein the membrane is dried by evaporating water at ambient temperature or at a slightly elevated temperature.

9. The method of claim 1 wherein the drying agent is a non-solvent for cellulose acetates, is soluble in the casting solution, insoluble in water, and has low surface tension.

10. The method of claim 1 wherein the solvent is an organic solvent.

11. The method of claim 1 wherein the solvent is acetone, dioxane, methanol, or mixtures thereof.

12. The method of claim 1 wherein at least one of the solvents is a poor solvent for the cellulose acetates.

13. The method of claim 1 wherein the cellulose acetates are cellulose acetate, cellulose triacetate, or a blend of cellulose acetate and cellulose triacetate.

14. The method of claim 1 wherein the casting solution is cast onto a smooth supporting substrate to form said thin uniform layer.

15. The method of claim 1 wherein the casting solution additionally contains a swelling agent.

16. The method of claim 1 wherein the drying agent is selected from the group consisting of:

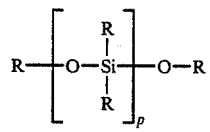

$C_nH_{2n+2}$ (alkanes)
$C_nH_{2n}$ (alkenes)
$C_nH_n$ (alkynes)
$C_nH_{2n+1}X$

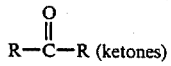 (ketones)

R—O—R (ethers)
$(CH_2)_m$ (cycloalkanes)
$C_aH_{2a-2}$ (cycloalkenes)

 (aromatic hydrocarbons)

and

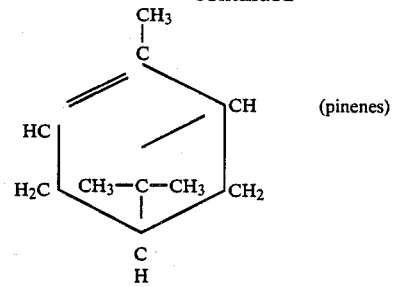 (pinenes)

wherein
R is an alkyl, aryl or alkyl-substituted derivative
p is a integer of at least 1,
n is a integer of at least 8,
X is a chloro or nitro group,
a is an integer of at least 7,
m is an integer from 7 to about 12, and
Y, if present, is lower alkyl, chloro or nitro.

17. The method of claim 1 wherein the drying agent is a polysiloxane, hydrocarbon, ether, ketone, chlorohydrocarbon or nitrohydrocarbon.

18. The dried membrane prepared by the method of claim 1.

19. The dried membrane prepared by the method of claim 2.

20. The dried membrane prepared by the method of claim 3.

21. The dried membrane prepared by the method of claim 4.

22. The dried membrane prepared by the method of claim 5.

23. The dried membrane prepared by the method of claim 6.

24. The dried membrane prepared by the method of claim 7.

25. The dried membrane prepared by the method of claim 8.

26. The dried membrane prepared by the method of claim 9.

27. The dried membrane prepared by the method of claim 10.

28. The dried membrane prepared by the method of claim 11.

29. The dried membrane prepared by the method of claim 12.

30. The dried membrane prepared by the method of claim 13.

31. The dried membrane prepared by the method of claim 14.

32. The dried membrane prepared by the method of claim 15.

33. The dried membrane prepared by the method of claim 16.

34. The dried membrane prepared by the method of claim 17.

* * * * *